Aug. 3, 1926.
J. NELSON
1,594,683
LOCK FOR STEERING WHEELS OF MOTOR VEHICLES
Filed June 12, 1925
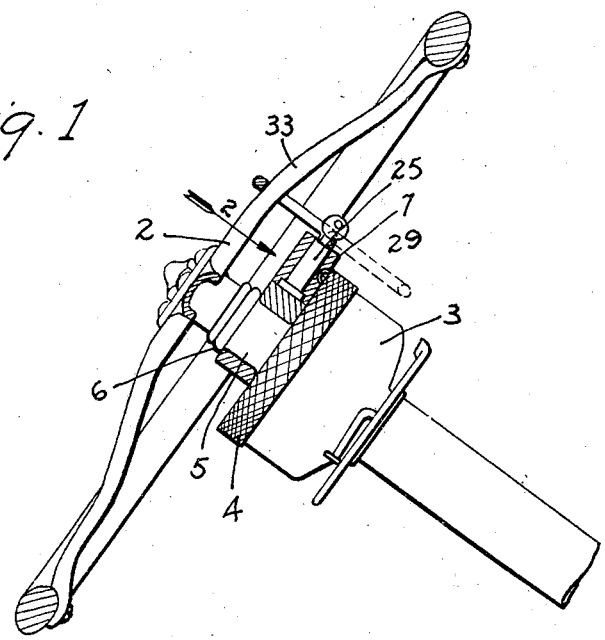
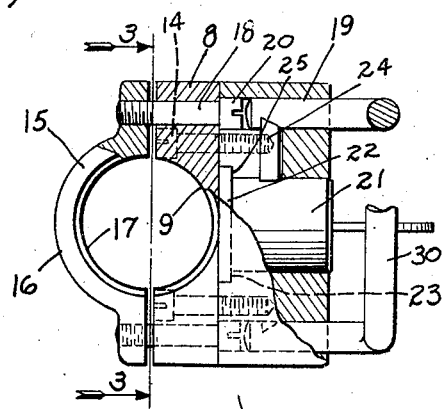
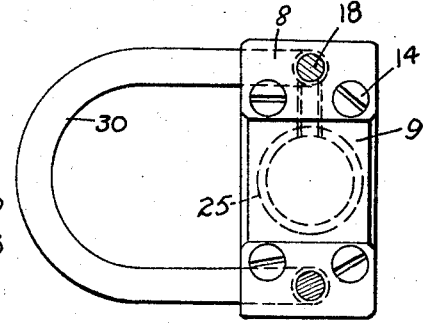
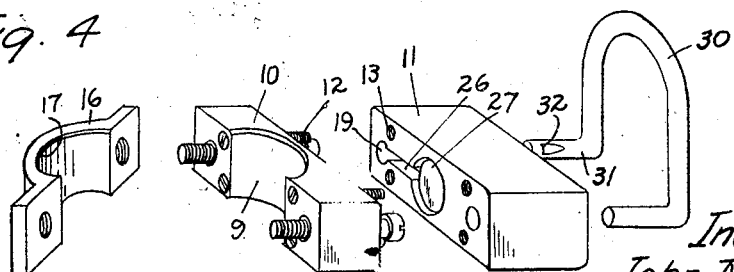
Inventor
John Nelson
by Hazard and Miller
Attys.

Patented Aug. 3, 1926.

1,594,683

UNITED STATES PATENT OFFICE.

JOHN NELSON, OF BAKERSFIELD, CALIFORNIA.

LOCK FOR STEERING WHEELS OF MOTOR VEHICLES.

Application filed June 12, 1925. Serial No. 36,601.

My invention is a steering wheel lock for motor vehicles of the type which may be bolted or clamped to the steering rod housing and provided with a staple to fit over the spokes of the steering wheel.

My lock is adapted to clamp on the steering column with a series of clamping studs or screws which are inaccessible and cannot be removed when the hasp is in position locking the steering wheel or when the hasp is hanging and locked in its disengaged position. I provide a yoke having an inner block which may be attached to a lock supporting a housing and an outer yoke attached to the inner block. The lock used is preferably of a standard type having a cylindrical barrel and a slidable detent or bolt, the bolt engaging either of the stems of a staple. When the staple is thus looped over a spoke of the steering wheel the lock will hold the wheel from moving and the staple may be positioned in the reverse direction when not in use. The staple itself prevents access to the studs or screws for holding the various elements in position.

My invention will be more readily understood from the following description and drawings, in which:—

Figure 1 is a side elevation of a steering column with my lock attached, the lock and portion of the steering wheel being shown in sections.

Fig. 2 is an enlarged face view of the lock in the direction of the arrow 2 of Fig. 1, showing part of the lock in section.

Fig. 3 is a section of Fig. 2 on the line 3—3 in the direction of the arrows.

Fig. 4 is a disassembled perspective of the various elements of the lock in their relative position.

In the drawings I have shown the lock attached to the steering column as generally used and standard with the Ford automobile, in which the steering column 1 has a steering wheel 2 mounted on the upper end thereof with the housing 3 for the gearing used in this type of steering gear, this housing having a cap 4 with a collar 5 having a rim 6 at the upper end. The lock indicated generally by the numeral 7 is clamped to the neck 5 and thereby may be utilized to lock the steering wheel from rotation.

The construction and manner of clamping the lock to the neck above mentioned is as follows; having reference particularly to Figs. 2, 3 and 4:—

An inner yoke block 8 formed with a semi-circular curve 9 and a flat surface 10 is first bolted to the lock supporting housing 11 which is preferably a heavy piece of metal of the desired shape. These are secured together by means of studs 12 being threaded into the screw threaded apertures 13 in the housing 11. The construction shows four studs being utilized, these studs have their heads 14 counter-sunk in the face of the inner yoke block. The outer clamping yoke 15 preferably formed with the outer surface 16 concentric to the inner semi-circular surface 17 is secured to the inner yoke block 8 by means of screw threaded bolts 18 which are inserted through the staple holes 19 in the lock housing 11. These holes are sufficiently large so that the head of the bolt will have a bearing as indicated by 20 against the face 10 of the inner yoke block. The device so described will be assembled after the lock has been inserted as hereunder set forth.

The lock barrel is designated generally by the numeral 21 and is shown of the barrel type having an enlarged rim 22 which engages a shelf indicated by 23. The lock has a slidable detent 24 or bolt which may be operated by a key 25 to slide in the slot 26 extending from the lock socket 27 towards one of the staple holes 19. It will thus be seen that when the yokes and the lock housing 11 with the lock therein are clamped to the steering column in this case to the collar 5 forming part of the column, that the lock will be held in rigid position. However, it is desirable to form a slight recess 28 in the under face of the housing block 11 to engage a screw 29 which is generally used to clamp the collar 5 through the medium of the cap 4 in fixed relation to the housing 3 of the steering mechanism gearing.

The staple 30 has right angularly positioned stems 31 each having a notch 32. The stems fit in the staple holes 19 and are secured therein by the detent or bolt 24 engaging the notch 32. I may utilize a lock having oppositely positioned locking bolts or with a single detent as shown. The single detent lock however, is sufficient.

It is believed that the manner of using my lock will be obvious from the above description, however, it may be stated that the staple 30 is hooked over a spoke 33 of the steering wheel 2 as shown by the solid lines in Fig. 1 and then the stems are locked into the staple holes 19. When the wheel is unlocked the staple is placed in the reverse position as indicated by the dotted lines in Fig. 1 and then locked into such position. This prevents loss of the staple. Also when the staple is locked either by engaging a spoke of the steering wheel or in its non-operative position above described, it is impossible to engage the heads of the bolts 18 which can only be manipulated through the staple holes 19. Therefore, when my lock is once installed on the steering column and the staple is kept locked in either of the positions above described, the lock cannot be removed.

My lock may be considerably changed in design to fit different types and shapes of steering columns without departing from the spirit thereof and the various yoke elements and the lock housing block may also be modified in accordance with the shape of the steering column for the particular type of lock to be fitted therein. It is to be understood that suitable standard locks may be inserted in the lock socket 27.

Having described my invention, what I claim is:

1. A steering wheel lock comprising in combination with a steering column having a steering wheel with spokes, of a yoke formed of an inner yoke block and an outer yoke block in separate parts secured together, a lock housing detachably secured to the inner yoke block but disconnectible when the lock secures a spoke, a lock inserted in the lock housing, a staple adapted to engage a spoke of the steering wheel and having stems inserted in the lock housing and secured therein by the lock.

2. A steering wheel lock as claimed in claim 1, having the inner yoke secured to the lock housing by screws having their heads in the face of the inner yoke and covered by the outer yoke and screws passing through the inner yoke and threaded into the outer yoke, having their heads within the structure of the lock housing.

3. A steering wheel lock as claimed in claim 1, having staple holes in the lock housing, screws with their heads situated therein extending through the inner yoke and threaded into the outer yoke and a bolt operated by the lock adapted to engage the stems of the staples.

4. A steering wheel lock as claimed in claim 1, having staple holes extending through the lock housing structure, a lock socket in said lock housing, a slot at one end extending from the lock socket to the staple holes, a lock situated in the lock socket and having a bolt situated in said slot.

5. A steering wheel lock comprising in combination a lock housing structure in the form of a block, an inner yoke block having a flat face on one side and a curved portion on the other, a lock socket in the lock housing, a slot extending laterally therefrom, a lock in the lock socket having a bolt in the slot, means to secure the inner yoke block and the lock housing together, a pair of stable holes extending into the lock housing on opposite sides, one of said staple holes being positioned to allow the bolt to extend therein, an outer yoke member curved on its inner face, the curves of said yoke block and outer yoke member being adapted to clamp a steering column, screws situated with their heads in the staple holes passing through the inner yoke block and engaging the outer yoke member and a staple having stems bent at right angles and having a notch, said stems being adapted to seat in said staple holes and to be engaged by the lock bolt in either of two positions.

6. A steering wheel lock as claimed in claim 5, in which a series of studs extend through the inner yoke block have their heads counter-sunk therein and are screw threaded into the lock housing, the heads of said studs being covered by an outer yoke member when the latter is bolted into position.

7. A steering wheel lock comprising in combination a lock housing having a pair of holes extending into the housing, an outer clamping yoke, an inner clamping yoke, bolts inserted in the said staple holes through the inner clamping yoke and engaging the outer clamping yoke, the heads of the bolts being in the staple holes, and a lock to secure the staple in the staple holes, thereby preventing access to the heads of the bolts.

8. A steering wheel lock comprising in combination a lock housing having staple holes extending therein, an inner clamping yoke, first bolts securing said inner clamping yoke to the lock housing, an outer clamping yoke, second bolts inserted through the staple holes and passing through the inner yoke, said bolts securing the outer yoke and the inner yoke together, a staple, and means to lock the staple in the lock housing, thereby preventing access to the heads of the second bolts when the staple is locked.

In testimony whereof I have signed my name to this specification.

JOHN NELSON.